US006034596A

United States Patent [19]

Smith et al.

[11] Patent Number: 6,034,596

[45] Date of Patent: Mar. 7, 2000

[54] MOTOR VEHICLE TIRE PRESSURE AND TEMPERATURE SENSING SYSTEM

[76] Inventors: Julian Smith, P.O. 260, Circleville, N.Y. 10919; Steven Holmbraker, 130 Monhagen Ave., Middletown, N.Y. 10940; William Campbell, III, 5 Wintergreen Ave., Newburgh, N.Y. 12550; Arlin Bartlett, 72 Roosevelt Ave., Middletown, N.Y. 10940

[21] Appl. No.: 09/153,556

[22] Filed: Sep. 15, 1998

[51] Int. Cl.[7] .................................................... B60C 23/00

[52] U.S. Cl. .......................... 340/447; 340/445; 73/146.5

[58] Field of Search .................................... 340/442, 445, 340/447, 448, 449; 73/146.5, 146.8

[56] References Cited

U.S. PATENT DOCUMENTS

| | | | |
|---|---|---|---|
| 4,734,674 | 3/1988 | Thomas et al. | 340/447 |
| 5,040,562 | 8/1991 | Achterholt | 340/447 |
| 5,050,110 | 9/1991 | Rott | 702/130 |
| 5,289,161 | 2/1994 | Huang | 340/47 |
| 5,483,826 | 1/1996 | Schultz et al. | 340/445 |
| 5,717,135 | 2/1998 | Fiorletta et al. | 73/146.5 |
| 5,741,966 | 4/1998 | Handfield et al. | 73/146.5 |
| 5,837,891 | 11/1998 | Bridge | 73/146.8 |

*Primary Examiner*—Jeffery A. Hofsass
*Assistant Examiner*—Van T. Trieu
*Attorney, Agent, or Firm*—Richard A. Joel, Esq.

[57] ABSTRACT

A system for displaying dynamic readings of a motor vehicle's tire pressure, temperature and tire ride efficiency comprises individual integrated units that are removably attached to each valve stem. Each unit comprises a pressure sensor and a temperature sensor coupled to a microcontroller which activates a transmitter/receiver set with a measured signal. The signal is received by a transmitter/receiver set in a passenger compartment mounted display which feeds a signal through a microcontroller to the display unit. In operation, theft prevention serial numbers of the remote sensors are entered in the display unit. Each individual sensor may then be queried sequentially with the appropriate serial number to provide a pressure and temperature reading for a particular tire as well as battery condition. The readings and warning signals are activated in the display unit.

10 Claims, 3 Drawing Sheets

21
19
17
18
14
20
10
30a
16
30b
15
12
13
11

MOTOR VEHICLE TIRE PRESSURE AND TEMPERATURE SENSING SYSTEM

BACKGROUND OF THE INVENTION

This invention relates to tire monitoring systems particularly to wireless systems for indicating tire temperature and pressure on a display unit mounted within a motor vehicle.

The system which is described hereinafter is called the SENSATEC™ tire monitoring system. Other tire monitoring systems, such as the Fleet Specialties product, cannot provide internal tire temperature but rather measure gross pressure variation and are dedicated to a particular tire. The unit cannot be switched to another tire nor is it possible to measure temperature.

Another commercial tire monitoring unit is manufactured by Kisan Corporation which employs a transducer with a pick-up coil to generate a magnetic field producing a signal whose strength varies with tire pressure. The system requires replacement of the typical valve stem.

The prior art also includes U.S. Pat. No. 4,954,677 to Alberter, et al which comprises a tire pressure sensor including a reference gas pressure chamber and an electrically conductive diaphragm for activating a sensor circuit when the pressure is at a predetermined value.

U.S. Pat. No. 4,529,961 to Nishimura, et al employs a Bourdon tube which deforms with pressure to provide a signal. Bowler U.S. Pat. Nos. 5,231,872 and 5,335,540 describe a complicated tire monitoring apparatus for monitoring trucks while in use.

Other patents of interest include Brown U.S. Pat. No. 4,978,941 on a truck tire monitor and U.S. Pat. No. 5,035,137 to Burkard Also included are U.S. Pat. Nos. 4,966,034; 5,071,259; 5,140,851; and, 5,230,243.

The present inventions discloses a unique tire pressure and temperature monitor suitable for use on automobiles, trucks or other apparatus utilizing pneumatic tires.

SUMMARY OF THE INVENTION

This invention relates to a tire monitoring apparatus and particularly to an apparatus for displaying dynamic readings of a motor vehicle's tire pressure, temperature, and tire ride efficiency.

The apparatus comprises individual integrated units that are removable and readily screwed onto each valve stem. The monitoring units comprise a temperature sensor and a pressure sensor which feed signals to a microcontroller. The sensors are each battery powered and are keyed to a specific serial number. The resultant output signals are fed to a transmitter/receiver which transmits signals to a display unit located within the vehicle's passenger compartment. The signals are received by a transmitter/receiver set in the display unit, processed by a microcontroller and appear as a digital measurement with visual graphics/character and tri-color displays.

In operation, the system operates on vehicle start-up. The display unit queries each tire unit with a unique electronic identification or serial number that readies the tires to transmit tire data. The sensors then transmit tire pressure and temperature measurements back to the display unit which displays the pressure and temperature of each tire at various time intervals. Alarm means are provided to alert the operator if the temperature or pressure is potentially dangerous or out of range. The microcontroller in the display unit also computes and displays an overall tire-mileage/pressure/wear efficiency reading for the operator to observe.

The sensors are each self-contained and battery powered. The sensors also have a theft deterrent feature wherein each sensor has a unique electronic identification or serial number which renders them useless in other vehicles.

Accordingly, an object of this invention is to provide a new and improved tire monitoring system to provide dynamic measurements of tire pressure and temperature.

Another object of this invention is to provide a new and improved wireless tire monitoring system wherein individual monitoring units are readily attachable to valve stems.

A further object of this invention is to provide a new and improved tire monitoring system wherein sensors having a theft deterrent electronic ID are screwed on a valve stem and provide readings in a display mounted within a motor vehicle.

A more specific object of this invention is to provide a new and improved wireless tire monitoring system for pressure, temperature and tire wear efficiency wherein tire sensors removably mounted on each valve stem transmit a signal to a display through a microcontroller to alert the operator if the temperature or pressure is out of range or potentially dangerous through visual and audio warnings.

BRIEF DESCRIPTION OF THE DRAWINGS

The above and other objects and advantages of this invention may be more clearly seen when viewed in conjunction with the accompanying drawings wherein.

DETAILED DESCRIPTION OF THE INVENTION

Figure 1:
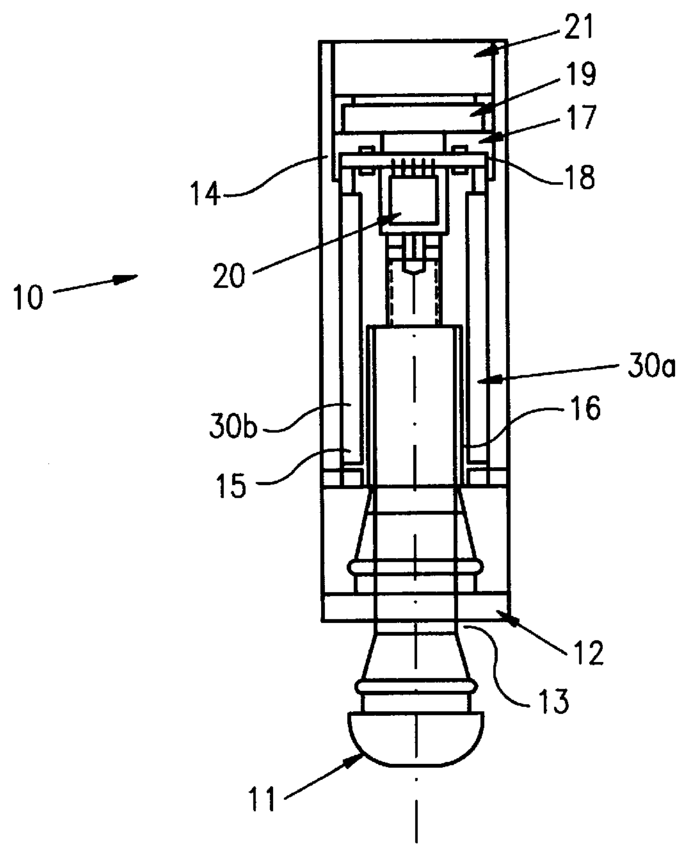
FIG. 1 is a cross-sectional view of a remotely mounted sensor.
Figure 2:
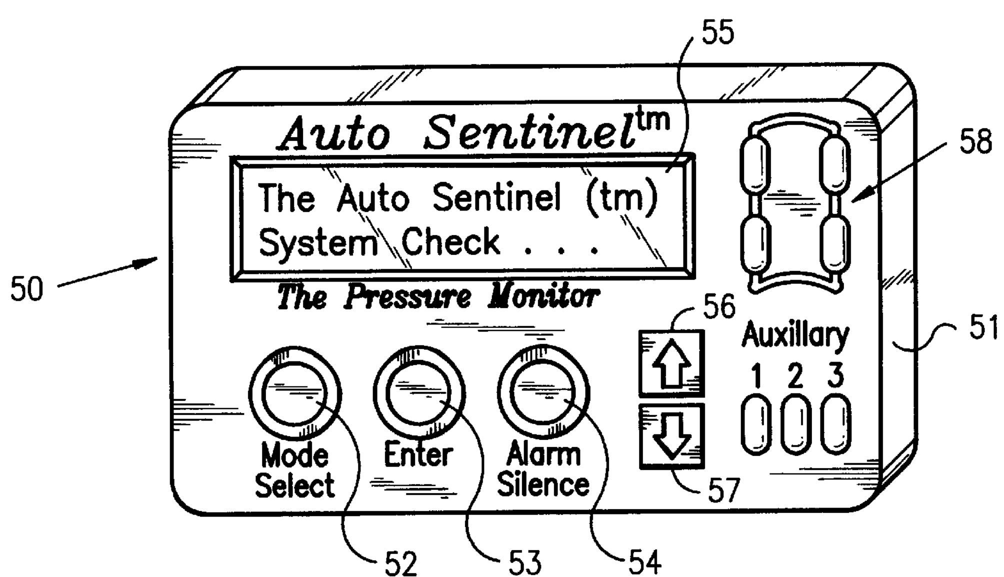
FIG. 2 is a perspective view of the display or local unit.

Referring now to FIG. 1 of the drawings, the invention comprises a tire monitoring system including a sensor unit 10 which screws onto a tire valve stem 11. Separate sensor units 10 are provided for each tire. The sensor unit 10 includes a bushing retainer 12 at its lower end 15 having an aperture 13 to engage the valve stem 11. The unit 10 further includes an outer casing 14 having a threaded recess 16 at its lower end 15 to engage the threaded valve stem 11. The recess 16 is in line with the bushing aperture 13 with the bushing 12 coupled to the lower end 15 of the casing 14.

A pressure sensor 20 is mounted at the upper internal end of the recess 16 and is fixed in position by a sealing nut 17 mounted on an O-ring 18. A battery 19 is located in engagement with the sealing nut 17 and pressure sensor 20. A cap 21 seals the upper end of the casing 14.

Figure 3:
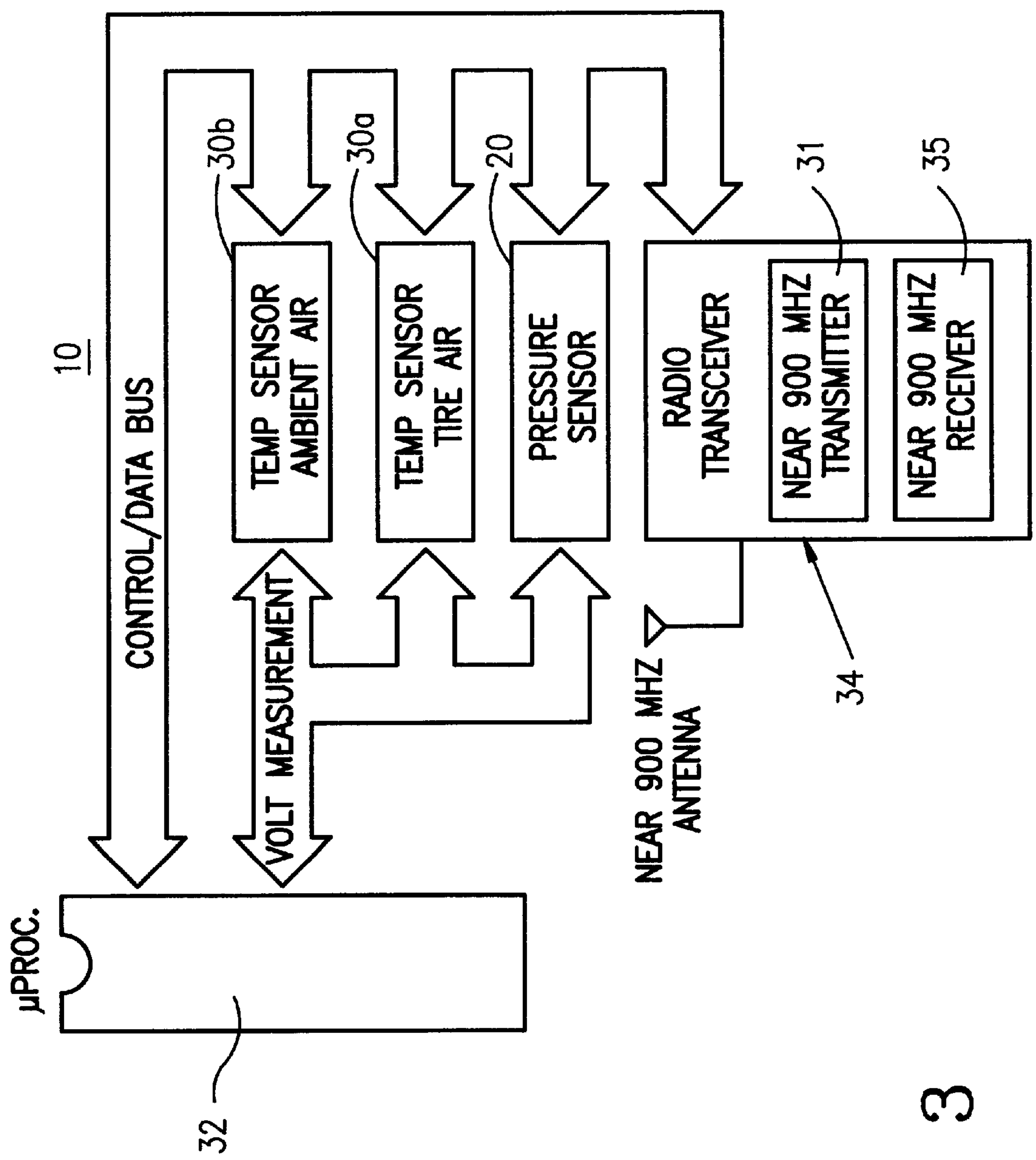
FIG. 3 is a schematic drawing of the remote temperature and pressure sensor system; and, FIG. 4 is a schematic drawing of the dash unit receiver system.

A temperature sensor 30*a* is also mounted within the sensor unit 10 to measure internal tire temperature as well as a sensor 30*b* to measure ambient air temperature. As shown in FIG. 3, the sensor unit 10 further includes a transmitter 31, a receiver 35 and a microcontroller 32 which receives and processes signals from the sensors 20 and 30*a*, 30*b*. The output of the microcontroller 32 is fed to the transmitter 31 which sends the pressure and temperature signals to a transceiver 63 mounted in a display unit 50 in the cab or passenger compartment of a motor vehicle.

The display or local unit 50 may be powered by batteries or wired to the vehicle electrical system. As shown in FIG.

2, the display unit 50 comprises a rectangular case 51 having control buttons for mode select 52, enter 53 and alarm silence 54 and a main graphics/character display 55 utilizing backlit LCD as well as tri-color LED's 58 visual indicators. Control buttons 56 and 57 with arrows located thereon are used to check the various tires. A serial port 59 is also included for connection to a computer for data logging purposes.

Mounted within the display unit 50 is a transceiver 63 and microcontroller 62 which queries the sensor unit 10 and receives sensing signals from transmitter 31 in response to its inquiry. The sensed signals are fed to a microcontroller 62 which processes the signals and supplies measured readings to the graphics/character display 55, and tire status to the tri-color LED's 58.

In operation, power is turned on in the main unit mounted within the display box 50. An initial self diagnostic check is made involving the LCD 55 and LED displays 58, communication with each sensing unit 10 and the system electronics. The operator will be alerted if a malfunction exists. If the status is acceptable, the system is ready for normal operation.

The display or control unit 50 transmits a wake up (requester) call to each sensor unit 10 in sequence. This signal activates the sensor units 10 from their normal lower power mode, specifically, the pressure sensor 20 and the temperature sensors 30*a* and 30*b*. The sensors 20 and 30*a*, 30*b* measure pressure and temperature respectively and transmit this information along with its location to the receiver 61. The resultant signal is fed to the display unit 50 and appears on both display units 55, 58. Vehicle weight information and pressure balance "quality of ride" information may also be displayed. In this case, the weight information would be derived from dynamic pressure and temperature and physical tire parameters. The quality of ride information is derived from dynamic pressure and temperature measurements. The initial measurements are complete when all tire positions have been queried once. Dynamic measurements are taken at regular intervals.

Whenever measurements are slightly out of range, a mild warning tone will sound and the graphic display 55 will show a warning signal. The effected tire position will be highlighted in yellow on the display 58.

The system is quite effective since a loud warning will sound when the measurement parameters are substantially out of the range determined by the user. At that time, the display 55 will show a warning message and the custom tri-color LED 58 tire position will highlight the effective tire position in red. As an added protection, a tone will sound and a message will appear on the display 55 when the battery is low.

At the end of monitoring inquiry, the display and control unit 50 may be turned off manually or automatically. Just before the actual power down, the unit 50 sends a requester signal to all sensors 10 which deactivates them or puts them in a sleep mode.

As a further feature, the display unit 50 includes an anti-theft connection that allows it to be wired to a vehicle's existing alarm system. The alarm is triggered by the removal of a sensor 10 which causes the particular sensor to suddenly register zero pressure.

The display or local unit 50 is internally mounted within the vehicle. This unit 50 is available in multiple styles—such as visor, dash or center console mounting. Regardless of mounting style or location, functionality will remain the same. The unit 50 will be constructed of ABS or a similar plastic material. In the trucking industry, all reference to sensor quantity will be assumed to be 18 for 18 wheel vehicles. This, however, is neither a product limitation or fixed quantity. Provisions for a "plug-in" LED display module 64 depicting a tandem trailer, as in the case of a dual trailer truck, may be included. This would raise the LED display quantity count to 26.

Figure 4:
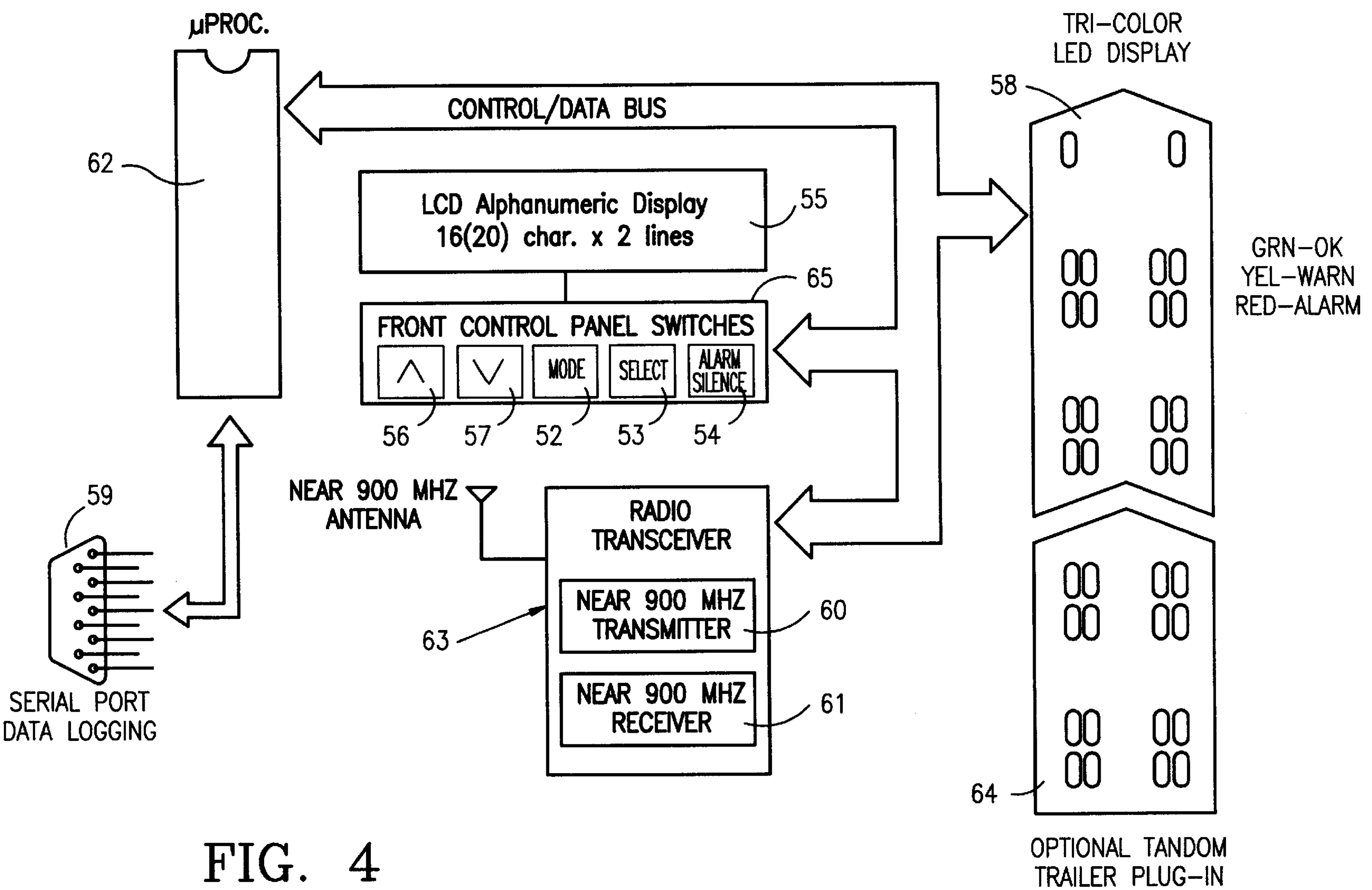

The display or local unit 50, shown in FIG. 4, will consist of an ultra low power CMOS Microcontroller 62, a near 900 Mhz bi-directional radio transreceiver 63, backlit LCD alphanumeric display module 55, tri-color LED 58 physical status indicators and data keypad 65. The keypad 65 will provide provisions for alarm silence, 54 mode select 52 and enter 53 buttons with up and down control buttons 56 and 57 for parameter entry.

On the first application of power, the local unit 50 will request the entry of serial numbers for the remote tire sensors 10 by their relative locations (this does not mean that they cannot be moved later). Upon completion of this introduction, this process will not have to be repeated again. On subsequent power up conditions, the local unit 50 will perform a circular query of the known sensors for both presence and operational conditions.

Functionality of the unit 50 will consist of a sequential query of each remote sensor 10 in the following manner. The local unit 50 will transmit a "wake up" signal, specifically designed to initiate the remote sensor transmission/reception process. This process will begin by sending the appropriate serial number, thus allowing the remaining sensors 10 to go back to sleep, while assuring communication with the correct device.

A request will be initiated for pressure, temperature (tire and ambient) and battery conditions. Upon reception of this information, the local unit 50 will then store the received information and then transmit an "OK" signal, thus assuring proper data receipt. In the event of inappropriate data, request for retransmission will be requested from the remote sensor 10. If all data appears to be in order, a sleep command will be issued to the appropriate sensor 10. This process, while appearing cumbersome, will thus assure maximum battery life of the remote sensor 10. The cycle will then continue for all known remote sensors 10, collecting data in a similar fashion. Upon receipt of all data, the display will then update all LED indicators 58 to their appropriate status. Green would indicate OK, yellow would indicate warning and red would indicate alarm. If a warning or alarm condition should occur, an internal beeper sounds, thus alerting the vehicle operator. This condition will also trigger a constant monitor of the particular tire in question. Provisions for theft of the sensors have also been provided. The local unit can query the sensors periodically when the vehicle is parked and if the signal for a known sensor 10 is not received, trigger an alarm or send a signal to the vehicle alarm system.

The remote sensor unit 10 will consist of an ultra low power CMOS Microcontroller 32, a near 900 Mhz bi-directional radio transceiver 34, pressure 20 and temperature sensors 30*a*, 30*b* (tire and ambient). The unit will be housed in a "screw on" valve mounted plastic housing 14. This housing 14 will also be weather-tight so as to protect the electronics from the elements, such as rain, snow and dirt. The unit 10 will perform simple data collection of pressure, temperature and battery level. This data will then be transmitted to the local unit when a request is received. Upon satisfactory data transmission, the unit will put itself in a "sleep" mode to preserve battery life. The cycle will then be repeated when a "wake up" is received. The remote sensor 10 will also have a unique serial number embedded within the microcontroller program code. This number is not configurable by the user or the factory once set. This feature will also deter theft because the unit 10 will be useless to someone not having the serial number. Also, there has been a "breakaway" area designed into the housing so in the event of physical damage—such as hitting the curb or vandalism, the unit 10 will shear off at a predetermined spot so as to not allow air pressure from escaping from the tire valve.

While the invention has been explained by a detailed description of certain specific embodiments, it is understood that various modifications and substitutions can be made in any of them within the scope of the appended claims which are intended also to include equivalents of such embodiments.

What is claimed, is:

1. A tire pressure monitor for coupling to tire valves of a motor vehicle comprising:

a sensor unit mounted to a tire valve, said unit comprising a pressure sensor and a pair of temperature sensors, a microcontroller connected to said sensors to receive signals therefrom, and a transmitter/receiver coupled to the microcontroller and receiving signals therefrom; and, a display unit mounted in the motor vehicle including a transmitter/receiver to send and receive signals from the transmitter/receiver in the sensor unit, a microcontroller connected thereto to receive and process signals to and from the display unit indicating tire pressure and internal tire temperature and ambient temperature.

2. A tire pressure monitor for coupling to tire valves of a motor vehicle in accordance with claim 1 wherein:

the sensor unit includes an electronic code identifier which is transmitted from the display unit to query the sensor unit, said code identifier providing theft proof means.

3. A tire pressure monitor for coupling to tire valves of a motor vehicle in accordance with claim 2 wherein:

the sensor unit includes an outer substantially cylindrical casing having an internal threaded recess for screwing onto a tire valve, a pressure sensor and sealing means mounted at the end of said recess, a sealing bushing mounted at the entrance to said recess, temperature sensors mounted along the recess, a battery mounted adjacent the sealing means, means for processing and transmitting pressure and temperature signals and a breakaway area permitting the sensor unit to shear off upon impact without affecting tire pressure.

4. A tire pressure monitor for coupling to tire valves of a motor vehicle in accordance with claim 2 wherein:

a plurality of sensor units are connected one to each tire of a motor vehicle; and, the display unit includes means for measuring and displaying the temperature and pressure of each tire and further includes warning means if the pressure and temperature exceed predetermined values.

5. A tire pressure monitor for coupling to tire valves of a motor vehicle in accordance with claim 4 wherein:

the means for displaying the temperature and pressure include an LCD alphanumeric display and an LED tri-color display indicating the particular tire being monitored and further including means for placing the display unit in a sleep mode upon satisfaction data transmission to lessen battery drain.

6. A tire pressure monitor for coupling to tire valves of a motor vehicle in accordance with claim 2 wherein:

the transmitter/receiver in the sensor unit and the display unit each comprise transceivers operating in the range of 900 Mhz.

7. A tire pressure monitor for coupling to tire valves of a motor vehicle in accordance with claim 2 wherein:

the microcontroller in the display unit computes overall tire-mileage/pressure/wear efficiency and provides output reading on the display.

8. A tire pressure monitor for coupling to tire valves of a motor vehicle in accordance with claim 2 wherein:

the display unit is wired to the motor vehicle electrical system.

9. A method for monitoring tires on a motor vehicle comprising the steps of:

providing a display unit and a sensor unit mounted to each tire valve;

providing power to the display unit;

performing a self diagnostic check involving communicating with each sensor unit with a theft deterrent code, the display unit and the system electronics to determine if a malfunction exists;

transmitting a wake up call to each sensor unit in sequence;

measuring tire pressure and temperature with each sensor unit as a wake up call is received;

transmitting the measured information to the display unit; and, displaying the measured information on said display unit.

10. A method for monitoring tires on a motor vehicle in accordance with claim 9 further comprising the step of:

providing a warning signal to sound if the measurements are out of a predetermined range.

* * * * *